United States Patent [19]

Shabrang

[11] Patent Number: 5,136,419

[45] Date of Patent: Aug. 4, 1992

[54] SEALED ELECTROCHROMIC DEVICE

[75] Inventor: Mani Shabrang, Midland, Mich.

[73] Assignee: The Dow Chemical Company, Midland, Mich.

[21] Appl. No.: 809,209

[22] Filed: Dec. 13, 1991

Related U.S. Application Data

[63] Continuation of Ser. No. 488,907, Mar. 6, 1990, abandoned.

[51] Int. Cl.$^5$ .................. G02F 1/15; G02F 1/153; F21V 9/00
[52] U.S. Cl. .................. 359/265; 359/275; 252/582
[58] Field of Search .................. 350/357

[56] References Cited

U.S. PATENT DOCUMENTS

| | | | |
|---|---|---|---|
| 3,283,656 | 11/1966 | Jones et al. | 88/107 |
| 3,971,624 | 7/1976 | Bruesch et al. | 350/357 |
| 4,231,641 | 11/1980 | Randin | 350/357 |
| 4,264,150 | 4/1981 | Yano et al. | 350/357 |
| 4,347,265 | 8/1982 | Washo | 427/108 |
| 4,699,471 | 10/1987 | Miyake et al. | 350/357 |
| 4,726,664 | 2/1988 | Tada et al. | 350/357 |
| 4,750,816 | 6/1988 | Ito et al. | 350/357 |

FOREIGN PATENT DOCUMENTS 62-177529  8/1987  Japan .................. 350/357

Primary Examiner—Jerome Jackson, Jr.
Assistant Examiner—Robert Limanek
Attorney, Agent, or Firm—Timothy S. Stevens

[57] ABSTRACT

An improved electrochromic device of the type employing: a working electrode, such as a thin essentially transparent layer of indium/tin oxide coated on glass; the working electrode being coated with an electrochromic layer, such as a thin essentially transparent layer of tungsten oxide; the electrochromic layer being coated with an ion conducting layer, such as a thin essentially transparent layer of a perfluorosulfonate polymer; the ion conducting layer being coated with a counter electrode, such as a thin essentially transparent layer of a layer of gold. The improvement is to operate such a device in an environment of a mixture of an inert gas and the vapor of a high dielectric constant material. This can be done in a sealed double pane window by forming such a device on one of the interior surfaces of the window panes and then filling the remaining space between the panes with a mixture of nitrogen and water vapor.

50 Claims, 2 Drawing Sheets

SEALED ELECTROCHROMIC DEVICE

This is a continuation of application Ser. No. 07/488,907, filed Mar. 6, 1990, now abandoned.

BACKGROUND OF THE INVENTION

Modern electrochromic devices generally comprise a number of layers such as is shown in FIG. 1 of U.S. Pat. No. 4,193,670. One example of such a device is: a backing of a pane of glass first coated with an electronic conductor such as a thin transparent layer of indium/tin oxide to form what some call a front electrode or a working electrode; then the working electrode is coated with a thin transparent layer of tungsten oxide to form an electrochromic layer; then the electrochromic layer is coated with a thin transparent layer of an ion conducting polymer (see U.S. Pat. No. 4,231,641) such as NAFION perfluorosulfonate polymer (from E. I. Du Pont de Nemours and Company, Wilmington DE) to form an ion conducting layer; and finally the ion conducting layer is coated with a thin transparent coating of gold to form a counter electrode. The completed device usually has the appearance of lightly tinted transparent glass. The device can be made to transmit substantially less light by applying an electrical potential between the working electrode and the counter electrode. This effect can be reversed by reversing the electrical potential to take the device through one cycle of operation. The theory of operation of such a device is: (1) that hydrogen ions and electrons are forced from the ion conducting layer into the electrochromic layer by the electrical potential and form a highly colored hydrogen/tungsten oxide bronze in the electrochromic layer; and (2) when the electrical potential is reversed, the hydrogen ions of the hydrogen/tungsten oxide bronze in the electrochromic layer and electrons are forced out of the electrochromic layer into the ion conducting layer converting the highly colored hydrogen/tungsten oxide bronze back into the essentially colorless tungsten oxide.

Several problems remain with such electrochromic devices. One problem is a deterioration of the device after it has been cycled several hundred times. U.S. Pat. No. 4,193,670 addressed this problem by placing a transparent electrically insulating but ionically conducting inorganic compound, such as a thin layer of silicon oxide, between the ion conducting layer and the electrochromic layer and between the working electrode layer and the electrochromic layer. The devices of U.S. Pat. No. 4,193,670 have a reported life of 5,000–7,000 cycles or about 5–6 years of estimated service at 3 cycles per day. This level of performance is short of the desired minimum of 11,000 cycles that would provide a 10 year estimated service at at 3 cycles per day.

SUMMARY OF THE INVENTION

One important benefit of the present invention is increased cycle life. The present invention is an improvement of electrochromic devices generally comprising an electronic conductor, an ion conducting layer, an electrochromic material, and a counter electrode. The improvement is to position such a device in a space consisting essentially of a mixture of an inert gas and the vapor of a high dielectric constant material, such as a mixture of nitrogen and water vapor.

DETAILED DESCRIPTION OF THE INVENTION

Figure 1:
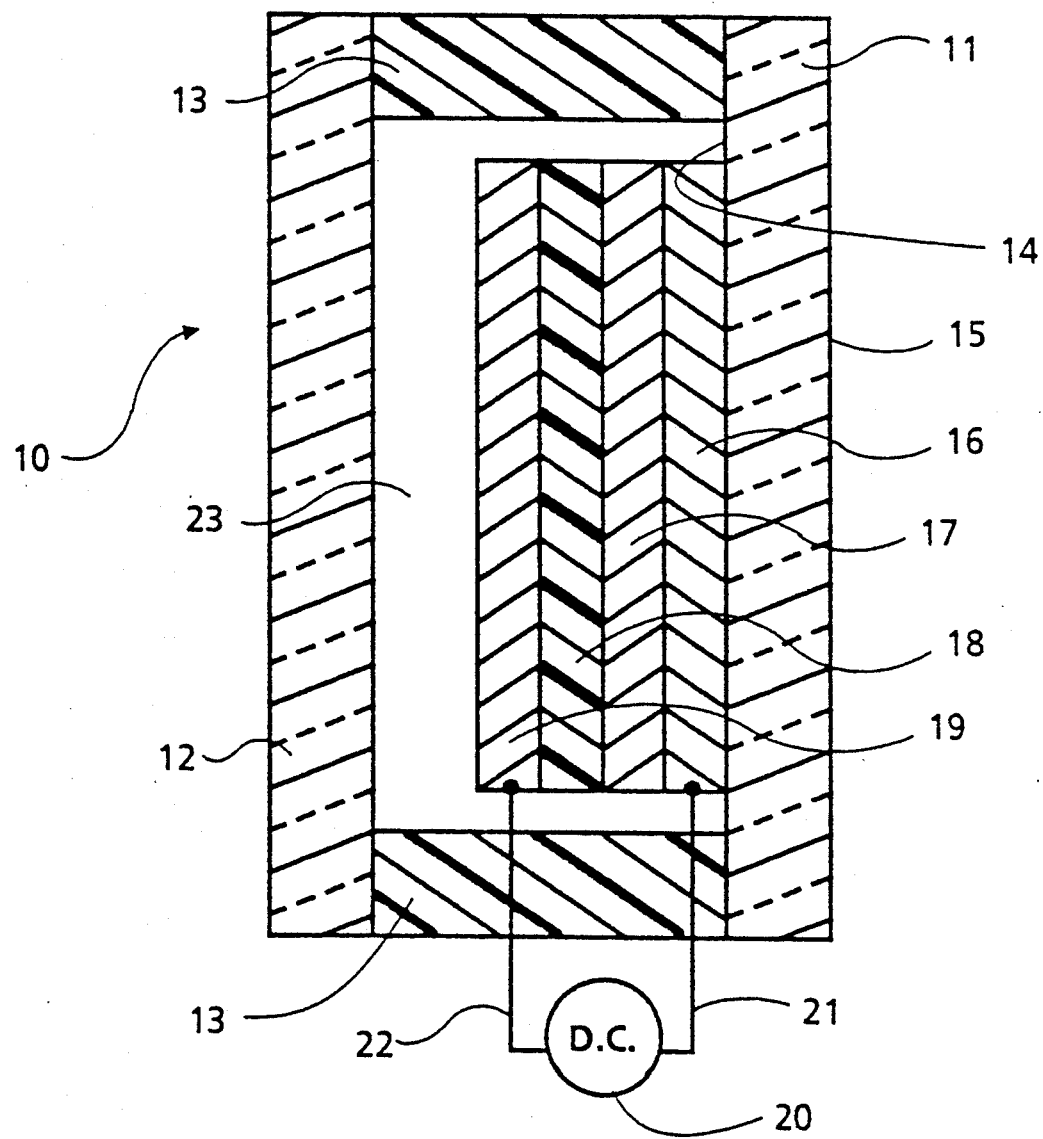
FIG. 1 is a cross-sectional side view of a double pane window embodiment of the present invention showing a multiple layer electrochromic device formed on one of the interior surfaces of the window.

Referring now to FIG. 1, therein is shown a sealed electrochromic double pane window 10. The window 10 includes a backing of a first pane of glass 11 and a panel of a second substantially biplanar spaced apart pane of glass 12. The periphery of the pane of glass 11 is sealed with the periphery of the pane of glass 12 by a seal means 13 of epoxy cement. The first pane of glass 11 has a first side 15 and a second side 14. The first side 15 is coated with a thin transparent electronically conductive layer of tin dipped indium oxide 16. Glass coated with tin dipped indium oxide (indium/tin oxide or ITO) is commercially available, e.g., from the Donnelly Corp., Holland MI, as ITO glass PD5002. An electrochromic layer 17 of tungsten oxide ($WO_3$) is deposited on the electrically conducting layer 16, see for example U.S. Pat. Nos. 4,193,670, 3,971,624, 4,231,641 and 4,338,000. An ion conducting layer 18 of a copolymer of tetrafluoroethylene and 1,1,2,2-tetrafluro-2((trifluoroethenyl)oxy)ethane sulfonic acid having an equivalent weight of 780 is formed on the electrochromic layer 17 by a dipping process to be described below. It should be understood that this dipping process is not critical in the present invention and that the ion conducting layer can be formed as desired. A counter electrode layer 19 of gold is deposited on the ion conducting layer 18, see for example U.S. Pat. Nos. 4,338,000 and 3,971,624 for a procedure for depositing gold layers. A direct current power supply 20 is connected to the electrically conducting layer 16 and the counter electrode layer 19 via a wire 21 and a wire 22. The pane of glass 11, the pane of glass 12 and the seal means 13 define a sealed space volume 23. The sealed space volume 23 is filled with a mixture of an inert gas and the vapor of a high dielectric constant material. It should be understood that the space volume 23 can be small in the present invention, such as when the pane of glass 12 is positioned immediately adjacent the layer 19.

Figure 2:
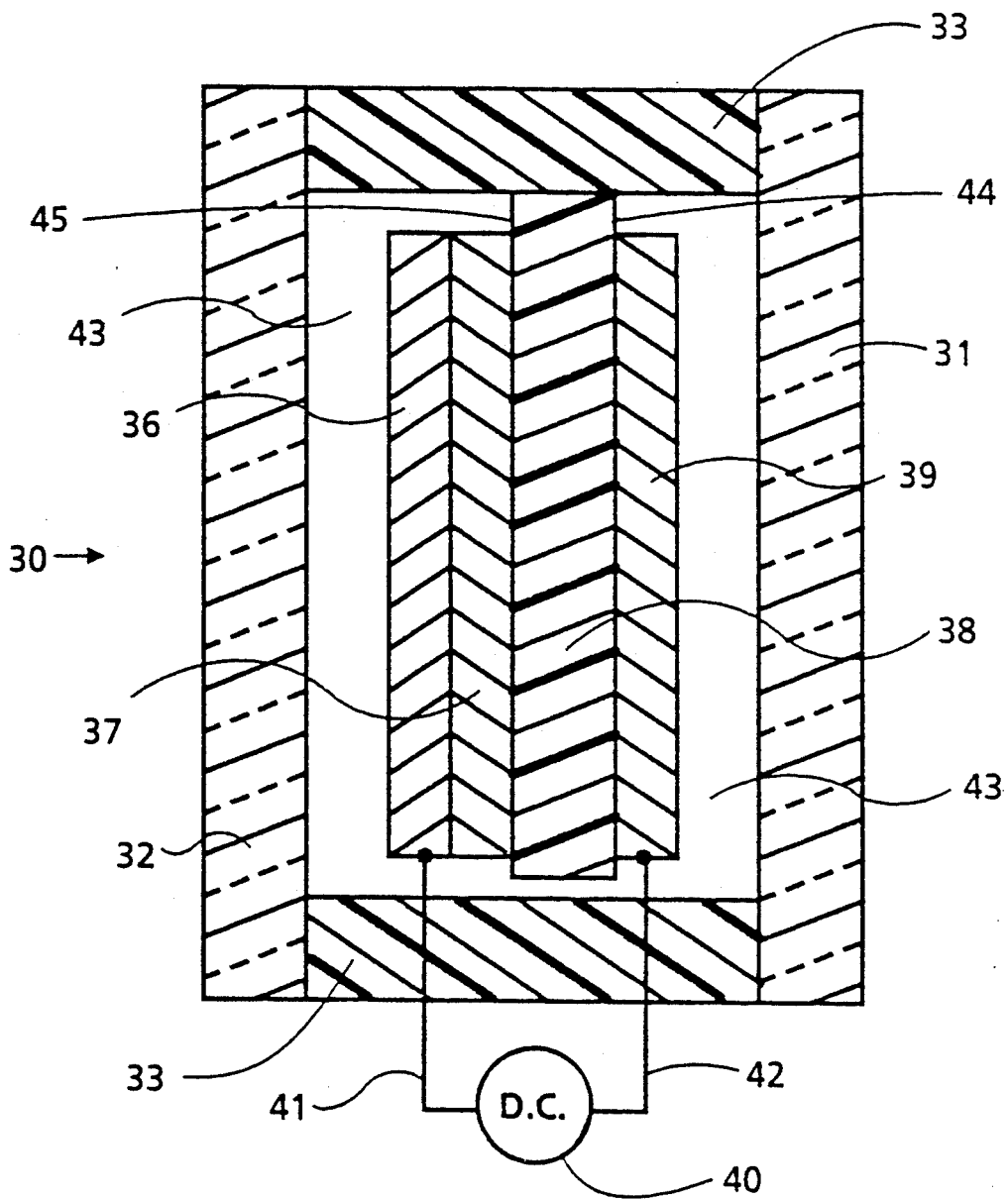
FIG. 2 is a crossectional view of a double pane window embodiment of the present invention showing an electrochromic device within the sealed space of the window.

Referring now to FIG. 2, therein is shown another sealed electrochromic double pane window embodiment 30 of the present invention. The window 30 includes a first pane of glass 31 and a second substantially biplanar spaced apart juxtaposed pane of glass 32. The periphery of the pane of glass 31 is sealed with the periphery of the pane of glass 32 by a seal means 33 of epoxy cement. The pane of glass 31, the pane of glass 32 and the seal means 33 define a sealed space volume An ion conducting layer 38 of a copolymer of tetrafluoroethylene and 1,1,2,2-tetrafluro-2((trifluoroethenyl)oxy)ethane sulfonic acid having an equivalent weight of 780 is eventually suspended in the sealed space volume. The ion conducting layer 38 has a first side 44 and a second side 45. An electrochromic layer 37 of tungsten oxide ($WO_3$) is deposited on the ion conducting layer 38, see for example U.S. Pat. Nos. 4,193,670, 3,971,624, 4,231,641 and 4,338,000. The electrochromic layer 37 is coated with a thin transparent electronically conductive layer of gold 36, see for example U.S. Pat. Nos. 4,338,000 and 3,971,624 for a procedure for depositing gold layers. A counter electrode layer 39 of gold is deposited on the first side 44 of the ion conducting layer 38, see for example U.S. Pat. Nos. 4,338,000 and 3,971,624 for a procedure for depositing gold layers. A direct current power supply 40 is connected to the electronically conducting layer 36 and the counter electrode layer 39 via a wire 41 and a wire 42. The layers 36, 37, 38, and 39 define an electrochromic system having a given solid volume that is less than the sealed space volume so that there is a remaining sealed space volume 43. The remaining sealed space volume 43 is filled with a mixture of an inert gas and the vapor of a high dielectric constant material.

The specific material used for the electronic conductor, e.g., the layer 16 of FIG. 1 and the layer 36 of FIG. 2, is not critical in the present invention and can include gold and other metals or nonmetals although tin-doped indium oxide (indium/tin oxide) is preferred for a device as shown in FIG. 1 whereas gold is preferred for the device shown in FIG. 2. The specific electrochromic material used in the present invention, e.g., the layer 17 in FIG. 1 and the layer 37 in FIG. 2, is not critical in the present invention and can include molybdenum oxide, and other materials that are colored by the simultaneous injection of protons (or other cations) and electrons, although tungsten oxide is preferred, as well as other types of electrochromic materials that are anodically transformed, such as nickel oxide. The specific material used for the counter electrode, e.g., the layer 19 in FIG. 1 and the layer 39 in FIG. 2, is not critical in the present invention. It is not critical in the present invention that the above layers contact each other as shown in FIG. 1 and FIG. 2. For example, the use of interposed silicon oxide and nucleating layers (to increase cycle life time) as taught in U.S. Pat. No. 4,193,670 is specifically contemplated in the present invention. The use of a metal grid (to overcome the IR drop of large areas of transparent working electrodes) as taught in U.S. Pat. No. 4,768,865 is specifically contemplated in the present invention. Thus, the present invention is an improvement upon any electrochromic device that incorporates an electronic conductor, an ion conducting layer, an electrochromic material and a counter electrode by positioning them in a space consisting essentially of a mixture of an inert gas and the vapor of a high dielectric constant material (or materials) if so doing increases the cycle life of the device by more than thirty percent relative to operating a like device in ordinary air.

An inert gas in the present invention is a gas or mixture of gases that do not chemically react with the electronic conductor, the ion conducting layer, the electrochromic material or the counter electrode to substantially reduce the cycle life of the device, i.e., more than thirty percent. Oxygen, for example, is not usually an inert gas in the present invention when it is present above a level that substantially reduces the cycle life of the device, e.g. above about ten percent oxygen with the device of Example 3. Inert gasses in the preferred embodiment of the present invention include nitrogen, and the nobel gases. Argon, and sulfur hexafluoride are sealed in commercially available double pane windows because argon and sulfur hexafluoride are relatively good thermal insulators. Argon should be an excellent inert gas in the present invention. Sulfur hexafluoride should be an excellent inert gas in the present invention. Nitrogen is an excellent inert gas in the present invention.

A high dielectric constant material in the present invention is a material that has a dielectric constant of greater than about 10. Preferably the dielectric constant of the high dielectric constant material of the present invention is greater than about 25. More preferably the dielectric constant of the high dielectric constant material of the present invention is greater than about 50. Even more preferably the dielectric constant of the high dielectric constant material of the present invention is greater than about 70. The most preferred high dielectric constant material of the present invention is water. Most preferably, the relative humidity of the inert gas of the present invention using the preferred perfluorosulfonate polymer ion conductor described below is between twenty-five and thirty-five percent. A relative humidity of above thirty-five percent, e.g., fifty percent, sixty percent, seventy-five percent, eighty percent, and even one hundred percent, results in a workable device but also in a shorter cycle lifetime for the device, especially at higher temperature, e.g., at fifty degrees centigrade. A relative humidity of below twenty-five percent, e.g., twenty percent, fifteen percent, ten percent, or even five percent, can result in progressively slower response time for such a device. A humidistat means would be beneficial in the embodiments of the present invention wherein the inert gas is sealed in a device to correct the relative humidity of the inert gas for shifts in temperature of the device. In the embodiments of the present invention where the inert gas is not sealed in the device, the relative humidity of the inert gas can be controlled as desired.

The seal means of the present invention, e.g., the epoxy cement 13 of FIG. 1 and the epoxy cement 33 of FIG. 2, should be selected to inhibit long term permeation of atmospheric oxygen into the inert gas. The best seal means in this regard, thus, would be welded glass. However, it is possible for water to be electrolyzed in an electrochromic device to generate oxygen and hydrogen. This electrolysis can be controlled by limiting the voltage applied to the device, e.g., by limiting the voltage to 2.1 volts in the preferred embodiment of the present invention. However, large surface area devices having significant IR drops in the working and/or counterelectrodes, without more, are believed to probably require higher applied voltages so that the device colors evenly across its area. The grid of U.S. Pat. No. 4,768,865 is one solution to this problem. In the sealed embodiments of the present invention the inert gas can, thus, become contaminated with oxygen which is believed to shorten the cycle life of the device. One solution to this problem is to occasionally flush the sealed space with fresh humidified inert gas.

The specific material used in the ion conducting layer is not believed to be critical in the present invention. For example, many polymeric electrolytes have been shown to be useful as ion conducting layers in electrochromic devices. U.S. Pat. Nos. 4,231,641, 3,971,624, 4,116,545, 4,750,817, 4,361,385, and 4,715,691, 4,193,670, 4,338,000. Nafion brand perfluorosulfonate polymer from DuPont was recognized as an ideal material. U.S. Pat. No. 4,231,641. A preferred material for use in the ion conducting layer of the present invention is the perfluorosulfonate material described in the copending application, Ser. No. 07/488,908, filed Mar. 16, 1990, i.e., a polymer having a substantially fluorinated backbone which has recurring pendant groups attached thereto represented by the formula $-O-(CFR'_f)_b-(CFR_f)_a-SO_3-$, where $a=0-3$, $b=0-3$, $a+b=$ at least 1, and $R_f$ and $R'_f$ are independently selected from the group consisting of a halogen and a substantially fluorinated alkyl group having one or more carbon atoms. A specific example is the copolymer of FFC=CFF and FRC=CFF having an equivalent weight of 780, where R is $-O-CFF-CFF-SOOO-H+$. This material has been shown to allow a higher temperature of operation than Nafion brand perfluorosulfonate polymer.

EXAMPLE 1

This example will show the preferred method of preparing a dispersion of the preferred perfluorosulfonate polymer of the present invention. Referring to U.S. Pat. No. 4,358,545, the sulfonyl fluoride form of the polymer is synthesized, using as the monomers tetrafluoroethylene (FFC=CFF) and 1,1,2,2-tetrafluro-2-((trifluoroethenyl)oxy) ethane sulfonyl fluoride (FRC=CFF, where R is $-O-CFF-CFF-SOOF$, see U.S. Pat. No. 3,560,568) to produce a polymer having an equivalent weight of 780. The polymer is then hot pressed into a film 1-20 thousands of an inch thick at a temperature no hotter than 20 degrees fahrenheit above its softening point. This helps to prevent the formation of a brown to gray color in the polymer. This film is cut into strips and the sulfonyl fluoride groups of the polymer are then converted to sulfonate groups by immersing the strips in 25% sodium hydroxide at 70-80 degrees centigrade for 12 hours. The polymer strips are then boiled repeatedly in deionized water to remove the excess sodium hydroxide. Infrared spectroscopy can be used to confirm conversion of the polymer to the sodium sulfonate form.

The polymer is then converted to the sulfonic acid form by twice immersing the strips in 6N hydrochloric acid at 70-90 degrees centigrade, four hours each time. The polymer is then washed repeatedly in 70 degree centigrade deionized water to remove the excess hydrochloric acid and finally air dried.

A near colorless dispersion of the sulfonic acid form of the polymer in ethanol/water is then prepared. The percentage of polymer to be added to the ethanol/water is determined by the equivalent weight and molecular weight of the polymer. Low equivalent weight polymers may be made up to give a higher weight percent solution than required and then diluted with additional quantities of ethanol and water to provide more solution. Typically an 800 equivalent weight polymer is made up at 5-10 percent by weight. High equivalent weight polymers having high melt viscosities are typically made up at 2 percent by weight.

It is very important in preventing the formation of color in the dispersion to use ethanol which does not contain ketones or other color forming impurities. Ethanol denatured with methanol or isopropanol has been found to be acceptable. The dried polymer strips are immersed in a 50/50 weight percent ethanol/water mixture and heated in a pressure reactor at 240 degrees centigrade for one to twelve hours to form the dispersion, a longer time being needed for the higher molecular weight/equivalent weight polymers. WARNING, diethyl ether can be produced as a byproduct during this reaction. The reactor is cooled and opened in a hood. The dispersion is then filtered by passing it through a coarse glass frit to remove any gels or undissolved material.

EXAMPLE 2

This example will show how to prepare a portion of the electrochromic device shown in FIG. 1, using the dispersion of Example 1. A $1 \times 2$ inch indium/tin oxide (ITO) coated glass slide (PD5002, Donnelly Corp., Holland Mich.) is soaked in a 50% sodium hydroxide solution for 10-15 minutes and small peripheral area of the ITO layer is coated with silver paint to facilitate an electrical connection to the ITO layer. A 3,000-4,000 Angstrom thick layer of tungsten oxide is deposited on the remaining ITO layer in a deposition chamber operated at a base oxygen pressure of $2 \times 10^{-5}$ torr and a substrate temperature of 50-70 degrees C. The slide is then dipped in the filtered solution of Example 1 for a few seconds, removed and then the inactive side of the slide is wiped clean. The slide is then placed in an oven at 85-90 degrees C for two hours to form the ion conducting layer on the tungsten oxide layer. Then, a 200-300 Angstrom thick layer of gold is deposited on a $1 \times 3$ centimeter central area of the ion conducting layer in a deposition chamber operated at base pressure of $1 \times 10^{-5}$ torr. A 600-1000 Angstrom thick additional gold layer is made on a small peripheral portion the gold layer to provide a thicker more rugged electrical connection to the gold layer. A 2.5 volt direct current (D.C.) power source is connected to the device (+ to the gold layer, - to the ITO layer) to darken it. The device remains darkened for an hour even when the potential is removed. Reversing the potential lightens the device. The device is tested in air to determine its cycle life. The cycle life of the device is 10,000 cycles. Please note that a device of the type shown in FIG. 2, although not the subject of this example, can be made by treating the polymer film as above but not cutting it into strips and not forming a dispersion of it. The various layers can then be deposited on the converted film and then it can be sealed in a double pane window.

EXAMPLE 3

This example will show the completion of the device of FIG. 1. The procedure of Example 2 is repeated to obtain a new electrochromic device. Four lengths of one eighth inch diameter glass tubing are laid on the periphery of this device with one end of each length of tubing overhanging the periphery of the glass slide about one half inch. A $1 \times 3$ inch glass slide is laid on the glass tubing so that it is juxtaposed and biplanar with the glass slide of the electrochromic device. Epoxy cement is then applied to the peripheral one eighth inch gap between the two glass slides as a sealing means. When the epoxy cement has hardened, the two lengths of tubing overhanging the long ends of the slide are fused shut at their overhanging tips with a flame. Nitrogen having a relative humidity of thirty percent is then flowed into one of the glass tubes overhanging the short ends of the slide, flowed between the two glass slides to the other end of the device and then flowed out of the remaining glass tube. The flow of nitrogen is then stopped and the tips of these tubes are then also fused shut with a flame to seal the humidified nitrogen in the space between the glass slides. The device is tested to determine its cycle life. The cycle life of the device is 14,000 cycles. It is believed that if the voltage applied to the device were closer to 2.1 volts, then the device of this example would have had an even longer cycle life.

EXAMPLE 4

A new device of Example 3 is made except that the flow of humidified nitrogen is continued through the device. The device is tested to determine its cycle life. The cycle life of the device is 30,000 cycles.

What is claimed is:

1. In an improved electrochromic device comprising a plurality of layers on one side of a backing, the layers generally comprising an electronically conducting layer, an electrochromic layer, an ion conducting layer and a counter electrode layer, wherein the improvement comprises:
   (a) a panel, the panel juxtaposed substantially biplanar and spaced away from the one side of the backing and the layers thereon leaving a space volume between the panel and the layers; and
   (b) means for sealing the panel with the backing so that at least a portion of the space volume is sealed between the panel and the backing to form a sealed space volume;
   (c) a mixture of an inert gas and the vapor of a high dielectric constant material positioned in the sealed space volume, the mixture having an oxygen content of less than 10 percent.

2. The device of claim 1, wherein the high dielectric constant material has a dielectric constant of greater than about 25.

3. The device of claim 2, wherein the high dielectric constant material has a dielectric constant of greater than about 50.

4. The device of claim 3, wherein the high dielectric constant material has a dielectric constant of greater than about 70.

5. The device of claim 4, wherein the high dielectric constant material is water.

6. The device of claim 5, wherein the backing and the panel each are about the same size and wherein the means for sealing is located at the peripheral edges of the backing and the panel.

7. The device of claim 6, wherein the backing and the panel comprise panes of glass.

8. The device of claim 7, wherein the ion conducting layer comprises a polymeric electrolyte.

9. The device of claim 8, wherein the electronically conducting layer comprises indium/tin oxide, the electrochromic layer comprises tungsten oxide, the ion conducting layer comprises a perfluorosulfonic acid polymer and the counter electrode layer comprises gold.

10. In an improved sealed double pane window generally comprising a first pane of glass peripherally sealed with a second juxtaposed spaced apart substantially biplanar pane of glass so that a space volume is sealed between the first pane of glass and the second pane of glass, the first pane of glass having a first side and a second side, the second side being exposed to the sealed space volume, wherein the improvement comprises:
   a multi-layer electrochromic system coated on the second side of the first pane of glass, the electrochromic system comprising an electronically conducting layer, an electrochromic layer, an ion conducting layer and a counter electrode layer; and
   (b) a mixture of an inert gas and the vapor of a high dielectric constant material positioned in the sealed space volume, the mixture having an oxygen content of less than 10 percent.

11. The window of claim 10, wherein the high dielectric constant material has a dielectric constant of greater than about 25.

12. The window of claim 11, wherein the high dielectric constant material has a dielectric constant of greater than about 50.

13. The device of claim 12, wherein the high dielectric constant material has a dielectric constant of greater than about 70.

14. The device of claim 13, wherein the high dielectric constant material is water.

15. The device of claim 14, wherein the ion conducting layer comprises a polymeric electrolyte.

16. The device of claim 15, wherein the second side of the first pane of glass is coated with indium/tin oxide to form an electronically conducting layer, the electrochromic layer consists essentially of tungsten oxide positioned on the indium/tin oxide, the ion conducting layer consists essentially of a perfluorosulfonate polymer positioned on the tungsten oxide and the counter electrode layer consists essentially of gold positioned on the perfluorosulfonate polymer.

17. In an improved sealed double pane window generally comprising a first pane of glass peripherally sealed with a juxtaposed spaced apart second substantially biplanar pane of glass so that a given space volume is sealed between the first pane of glass and the second pane of glass, wherein the improvement comprises:
   (a) a multi-layer electrochromic system of a given solid volume, the electrochromic system positioned in the sealed space volume, the volume of the electrochromic system being less than the sealed space volume so that there is a remaining sealed space volume, the electrochromic system comprising an electronically conducting layer, an electrochromic layer, an ion conducting layer and a counter electrode layer; and
   (b) a mixture of an inert gas and the vapor of a high dielectric constant material positioned in the remaining sealed space volume, the mixture having an oxygen content of less than 10 percent.

18. The window of claim 17, wherein the high dielectric constant material has a dielectric constant of greater than about 25.

19. The window of claim 18, wherein the high dielectric constant material has a dielectric constant of greater than about 50.

20. The device of claim 19, wherein the high dielectric constant material has a dielectric constant of greater than about 70.

21. The device of claim 20, wherein the high dielectric constant material is water.

22. In an improved electrochromic device comprising an electronic conductor, and electrochromic material, an ion conducting layer, and a counter electrode, the improvement comprising: positioning the electronic conductor, the ion conducting layer, the electrochromic material and the counter electrode in a space consisting essentially of a mixture of an inert gas and water vapor, the mixture having an oxygen content of less than 10 percent.

23. The device of claim 5, wherein the relative humidity of the inert gas is higher than five percent.

24. The device of claim 5, wherein the relative humidity of the inert gas is higher than ten percent.

25. The device of claim 5, wherein the relative humidity of the inert gas is higher than twenty percent.

26. The device of claim 5, wherein the relative humidity of the inert gas is higher than twenty percent and lower than fifty percent.

27. The device of claim 14, wherein the relative humidity of the inert gas is higher than five percent.

28. The device of claim 14, wherein the relative humidity of the inert gas is higher than ten percent.

29. The device of claim 14, wherein the relative humidity of the inert gas is higher than twenty percent.

30. The device of claim 14, wherein the relative humidity of the inert gas is higher than twenty percent and lower than fifty percent.

31. The device of claim 21, wherein the relative humidity of the inert gas is higher than five percent.

32. The device of claim 21, wherein the relative humidity of the inert gas is higher than ten percent.

33. The device of claim 21, wherein the relative humidity of the inert gas is higher than twenty percent.

34. The device of claim 21, wherein the relative humidity of the inert gas is higher than twenty percent and lower than fifty percent.

35. The device of claim 22, wherein the relative humidity of the inert gas is higher than five percent.

36. The device of claim 23, wherein the relative humidity of the inert gas is higher than ten percent.

37. The device of claim 24, wherein the relative humidity of the inert gas is higher than twenty percent.

38. The device of claim 25, wherein the relative humidity of the inert gas is higher than twenty percent and lower than fifty percent.

39. The device of claim 9, wherein the ion conducting layer consists essentially of a polymer having a substantially fluorinated backbone which has recurring pendant groups attached thereto represented by the formula $-O-(CFR'_f)_b-(DFR_f)_a-SO_3-$, where $a=0-3$, $b=0-3$, $a+b=$ at least 1, and $R_f$ and $R'_f$ are independently selected from the group consisting of a halogen and a substantially fluorinated alkyl group having one of more carbon atoms.

40. The device of claim 39, wherein the formula comprises $-O-(CFR'_f)_b-(CFR_f)_a-SO_3-H^+$, where $a=0-3$, $b=0-3$, $a+b=$ at least 1, $R_f$ and $R'_f$ are independently selected from the group consisting of a halogen and a substantially fluorinated alkyl group having one or more carbon atoms.

41. The device of claim 40, wherein the ion conducting layer comprises a copolymer of FFC=CFF and FRC=CFF, where R is $-O-CFF-CFF-SOOO-H^+$.

42. The device of claim 41, wherein the inert gas consists essentially of nitrogen.

43. The device of claim 16, wherein the ion conducting layer consists essentially of a polymer having a substantially fluorinated backbone which has recurring pendant groups attached thereto represented by the formula $-O-(CFR'_f)_b-(CFR_f)_a-SO_3-$, where $a=0-3$, $b=0-3$, $a+b=$ at least 1, and $R_f$ and $R'_f$ are independently selected from the group consisting of a halogen and a substantially fluorinated alkyl group having one or more carbon atoms.

44. The device claim 43, wherein the formula comprises $-O-(CFR'_f)_b-(CFR_f)_a-SO_3-H^+$, where $a=0-3$, $b=0-3$, $a+b=$ at least 1, $R_f$ and $R'_f$ are independently selected from the group consisting of a halogen and a substantially fluorinated alkyl group having one or more carbon atoms.

45. The device of claim 44, wherein the ion conducting layer comprises a copolymer of FFC=CFF and FRC=CFF, where R is $-O-CFF-CFF-SOOO-H^+$.

46. The device of claim 45, wherein the inert gas consist essentially of nitrogen.

47. The device of claim 21, wherein the ion conducting layer consists essentially of a polymer having a substantially fluorinated backbone which has recurring pendant groups attached thereto represented by the formula $-O-(CFR'_f)_b-(CFR_f)_a-SO_3-$, where $a=0-3$, $b=0-3$, $a+b=$ at least 1, and $R_f$ and $R'_f$ are independently selected from the group consisting of a halogen and a substantially fluorinated alkyl group having one or more carbon atoms, the counter electrode layer consists essentially of gold positioned on one side of the ion conducting layer, the electrochromic layer consists essentially of tungsten oxide positioned on the other side of the ion conducting layer and the electronically conducting layer consists essentially of gold positioned on the electrochromic layer.

48. The device of claim 47, wherein the formula comprises $-O-(CFR'_f)_b-(CFR_f)_a-SO_3-H^+$, where $a=0-3$, $b=0-3$, $a+b=$ at least 1, $R_f$ and $R'_f$ are independently selected from the group consisting of a halogen and a substantially fluorinated alkyl group having one or more carbon atoms.

49. The device of claim 48, wherein the ion conducting layer comprises a copolymer of FFC=CFF and FRC=CFF, where R is $-O-CFF-CFF-SOOO-H^+$.

50. The device of claim 49, wherein the inert gas consists essentially of nitrogen.

* * * * *